(12) United States Patent
Karri et al.

(10) Patent No.: US 11,907,857 B2
(45) Date of Patent: Feb. 20, 2024

(54) DYNAMIC SELECTION OF PARAMETER THRESHOLD VALUES

(71) Applicant: INTERNATIONAL BUSINESS MACHINES CORPORATION, Armonk, NY (US)

(72) Inventors: Venkata Vara Prasad Karri, Visakhapatnam (IN); Saraswathi Sailaja Perumalla, Visakhapatnam (IN); Sarbajit K. Rakshit, Kolkata (IN); Sowjanya Rao, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 469 days.

(21) Appl. No.: 17/338,210

(22) Filed: Jun. 3, 2021

(65) Prior Publication Data

US 2022/0391712 A1 Dec. 8, 2022

(51) Int. Cl.
  *G06N 5/02* (2023.01)
  *G16Y 40/30* (2020.01)
  *G16Y 40/20* (2020.01)
  *G16Y 10/75* (2020.01)

(52) U.S. Cl.
  CPC ............... *G06N 5/02* (2013.01); *G16Y 10/75* (2020.01); *G16Y 40/20* (2020.01); *G16Y 40/30* (2020.01)

(58) Field of Classification Search
  None
  See application file for complete search history.

(56) References Cited

U.S. PATENT DOCUMENTS

| 11,206,465 | B1* | 12/2021 | Krotosky | H04Q 9/02 |
| 2017/0153610 | A1* | 6/2017 | Kuntagod | H04M 1/72412 |
| 2018/0152517 | A1* | 5/2018 | Zhong | H04L 43/04 |
| 2019/0028534 | A1 | 1/2019 | Bloomquist et al. | |
| 2019/0132205 | A1* | 5/2019 | Du | H04L 41/0816 |
| 2020/0065711 | A1 | 2/2020 | Clement et al. | |
| 2021/0149394 | A1* | 5/2021 | Li | G07C 5/0808 |
| 2021/0387584 | A1* | 12/2021 | Daniels | G06V 20/58 |

(Continued)

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

(Continued)

*Primary Examiner* — Chris Parry
*Assistant Examiner* — Abderrahmen Chouat
(74) *Attorney, Agent, or Firm* — CUENOT, FORSYTHE & KIM, LLC

(57) ABSTRACT

First sensor data can be received from a first set of IoT devices. Sensor data collection rates can be determined for a first artificial intelligence model by analyzing the first sensor data using a second artificial intelligence model. Based on the sensor data collection rates, sensor control commands can be communicated to a second set of Internet of Things devices. The sensor control commands can specify, to the second set of Internet of Things devices, sensor data communication rates that respective ones of the second set of Internet of Things devices are to implement for communicating, to the first artificial intelligence model, second sensor data generated by sensors of the respective ones of the second set of Internet of Things devices.

20 Claims, 5 Drawing Sheets

(56) References Cited

U.S. PATENT DOCUMENTS

2022/0291666 A1* 9/2022 Cella .................... B25J 13/00
2022/0366494 A1* 11/2022 Cella .................... H04L 9/50

OTHER PUBLICATIONS

Shaw, K. et al., "What is a digital twin and why it's important to IoT," [online] Network World, © 2021 IDG Communications, Inc., Jan. 31, 2019, retrieved from the Internet: <https://www.networkworld.com/article/3280225/what-is-digital-twin-technology-and-why-it-matters.html>, 9 pg.

Armstrong, M.M., "Cheat sheet: What is Digital Twin?" [online] IBM Business Operations Blog, Dec. 4, 2020, retrieved from the Internet: <https://www.ibm.com/blogs/internet-of-things/iot-cheat-sheet-digital-twin/>, 7 pg.

Hulse, J.V. et al., "Threshold-based feature selection techniques for high-dimensional bioinformatics data," Network modeling analysis in health informatics and bioinformatics, Jun. 2012, vol. 1, pp. 47-61.

Breitgand, D. et al., "Automated and adaptive threshold setting: Enabling technology for autonomy and Self-management," In Second International Conference on Autonomic Computing (ICAC'05), IEEE, Jun. 13, 2005, pp. 204-215.

"IBM Spectrum Computing," [online] IBM Corporation [retrieved Jun. 3, 2021], retrieved from the Internet: <https://www.ibm.com/analytics/spectrum-computing>, 6 pg.

Robinson, S., "Building ML models for everyone: understanding fairness in machine learning," [online] Google Cloud Platform, AI & Machine Learning, Sep. 25, 2019, retrieved from the Internet: <https://cloud.google.com/blog/products/ai-machine-learning/building-ml-models-for-everyone-understanding-fairness-in-machine-learning>, 11 pg.

"Classification: Thresholding," [online] Google Developers, Machine Learing Crash Course [retrieved Jun. 3, 2021 retrieved from the Internet: <https://developers.google.com/machine-learning/crash-course/classification/thresholding>, 2 pg.

Manaligod, HJ et al., "Context computing for internet of things," Journal of Ambient Intelligence and Humanized Computing, Nov. 14, 2019, 3 pg.

* cited by examiner

500

┌─────────────────────────────────────────────────────────────┐
│ Receive first sensor data from a first set of IoT devices   │
│ 505                                                         │
└─────────────────────────────────────────────────────────────┘
                              ↓
┌─────────────────────────────────────────────────────────────┐
│ Determine sensor data collection rates for a first AI model │
│ by analyzing the first sensor data using a second AI model  │
│ 510                                                         │
└─────────────────────────────────────────────────────────────┘
                              ↓
┌─────────────────────────────────────────────────────────────┐
│ Based on the sensor data collection rates, communicate      │
│ sensor control commands to a second set of IoT devices, the │
│ sensor control commands specifying, to the second set of    │
│ IoT devices, sensor data communication rates that           │
│ respective ones of the second set of IoT devices are to     │
│ implement for communicating, to the first AI model, second  │
│ sensor data generated by sensors of the respective ones of  │
│ the second set of IoT devices                               │
│ 515                                                         │
└─────────────────────────────────────────────────────────────┘
                              ↓
┌─────────────────────────────────────────────────────────────┐
│ Receive the second sensor data from the second set of IoT   │
│ devices                                                     │
│ 520                                                         │
└─────────────────────────────────────────────────────────────┘
                              ↓
┌─────────────────────────────────────────────────────────────┐
│ Determine, by the first AI model, AI predictions by         │
│ processing the second sensor data                           │
│ 525                                                         │
└─────────────────────────────────────────────────────────────┘
                              ↓
┌─────────────────────────────────────────────────────────────┐
│ Output the AI predictions                                   │
│ 530                                                         │
└─────────────────────────────────────────────────────────────┘

FIG. 5

DYNAMIC SELECTION OF PARAMETER THRESHOLD VALUES

BACKGROUND

The present invention relates to data processing systems, and more specifically, to artificial intelligence systems.

Artificial intelligence (AI) is a technological field, which combines computer science and robust datasets, to enable problem-solving. AI also encompasses sub-fields of machine learning and deep learning, which are frequently mentioned in conjunction with AI. These disciplines are comprised of AI algorithms which seek to create expert systems which make predictions or classifications based on input data.

SUMMARY

A method includes receiving first sensor data from a first set of Internet of Things devices. The method also can include determining sensor data collection rates for a first artificial intelligence model by analyzing the first sensor data using a second artificial intelligence model executed by a processor. The method also can include, based on the sensor data collection rates, communicating sensor control commands to a second set of Internet of Things devices, the sensor control commands specifying, to the second set of Internet of Things devices, sensor data communication rates that respective ones of the second set of Internet of Things devices are to implement for communicating, to the first artificial intelligence model, second sensor data generated by sensors of the respective ones of the second set of Internet of Things devices.

A system includes a processor programmed to initiate executable operations. The executable operations include receiving first sensor data from a first set of Internet of Things devices. The executable operations also can include determining sensor data collection rates for a first artificial intelligence model by analyzing the first sensor data using a second artificial intelligence model executed by a processor. The executable operations also can include, based on the sensor data collection rates, communicating sensor control commands to a second set of Internet of Things devices, the sensor control commands specifying, to the second set of Internet of Things devices, sensor data communication rates that respective ones of the second set of Internet of Things devices are to implement for communicating, to the first artificial intelligence model, second sensor data generated by sensors of the respective ones of the second set of Internet of Things devices.

A computer program product includes a computer readable storage medium having program code stored thereon. The program code is executable by a data processing system to initiate operations. The operations include receiving first sensor data from a first set of Internet of Things devices. The operations also can include determining sensor data collection rates for a first artificial intelligence model by analyzing the first sensor data using a second artificial intelligence model executed by a processor. The operations also can include, based on the sensor data collection rates, communicating sensor control commands to a second set of Internet of Things devices, the sensor control commands specifying, to the second set of Internet of Things devices, sensor data communication rates that respective ones of the second set of Internet of Things devices are to implement for communicating, to the first artificial intelligence model, second sensor data generated by sensors of the respective ones of the second set of Internet of Things devices.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 5 is a block diagram illustrating an example of an AI modelling system according to an embodiment of the present invention.

DETAILED DESCRIPTION

Figure 1:
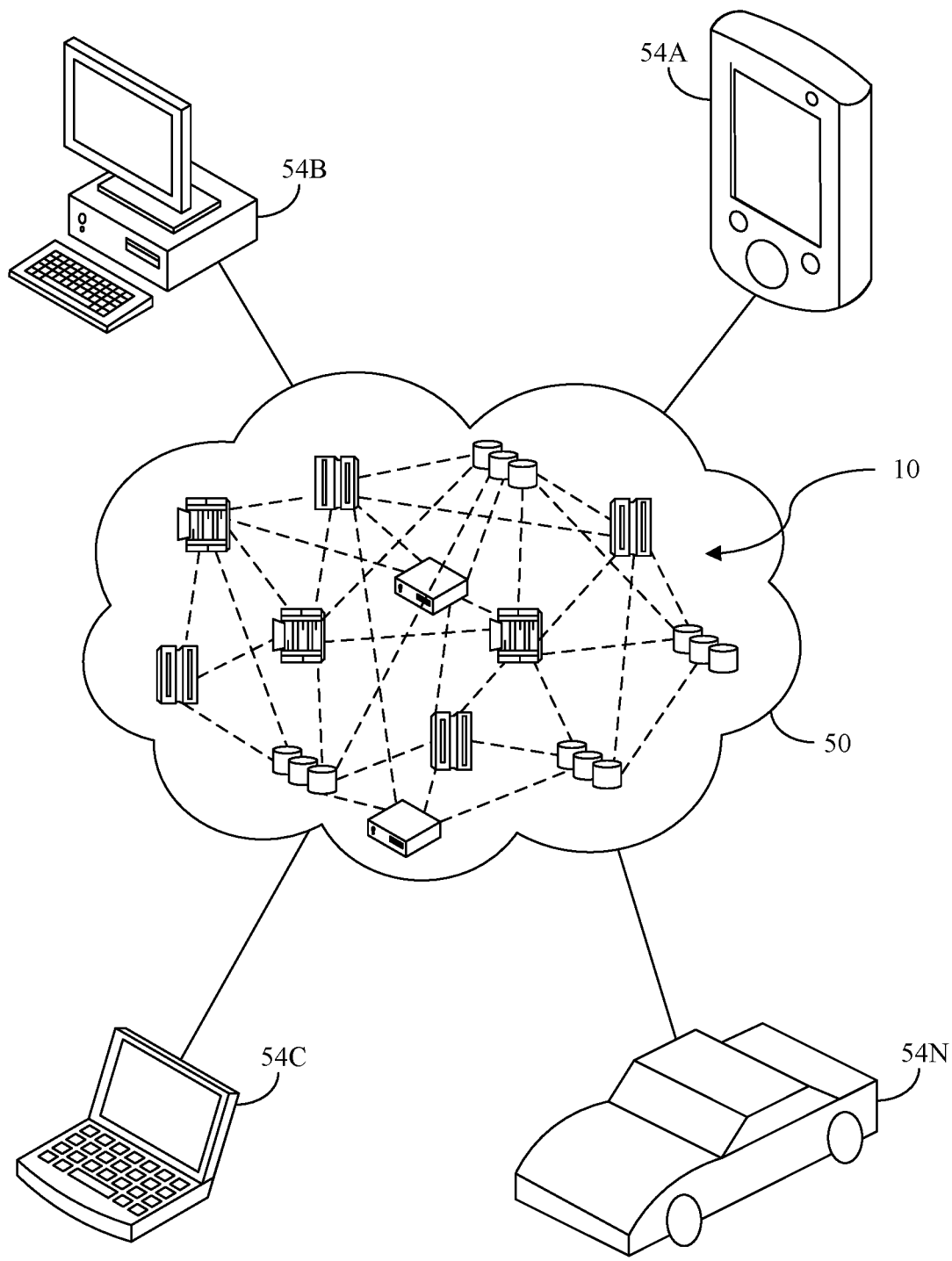
FIG. 1 depicts a cloud computing environment according to an embodiment of the present invention.

This disclosure relates to data processing systems, and more specifically, to artificial intelligence (AI) systems. The arrangements described herein provide an improvement to AI computer technology. Specifically, the present arrangements improve the efficiency of implementing AI by reducing the volume of data analyzed by AI models.

It is common for certain AI models to process very large data sets. The larger the data sets, the longer it takes to process the data sets. Moreover, large data sets cause AI models to tie up valuable computer resources, including processor resources, memory resources, bulk storage resources, network bandwidth, etc. The present arrangements reduce the volume of data processed by an AI model, thereby reducing the computer resources necessary to process the data and improving the efficiency of computers at performing AI analysis.

Specifically, the present arrangements can include a primary AI model and a context AI model that execute on one or more data processing systems performing digital twin simulations. The primary AI model can perform the AI analysis on data to make and output AI predictions based on digital twin simulation of future scenarios. The context AI model can predict contexts pertaining to data that is collected, and classify the data based on the predicted contexts. Again, the context AI model can make the context predictions and data classifications based on digital twin simulation of future scenarios. Based on the data classifications, the context AI model can determine values for data collection rates for various sensors. The values can be, for example, percentage values indicating percentages of data generating capacity to be used by the various sensors.

Based on the determinations made by the context AI model, the data processing system(s) can, in real time, configure sensors to generate data at the data collection rates determined for those types of sensors. Further, the data processing system(s) can, in real time, activate and deactivate sensors based on the determinations made by the context AI model. Accordingly, the volume of data being communicated to, and processed by, the primary AI model can be selectively controlled based on predicted data collection contexts.

In illustration, assume various sensors are used to monitor traffic on various roadways and current weather conditions, and the primary AI model processes the sensor data to predict near-future weather conditions and impact of the near-future weather conditions on near-future traffic conditions. If the context AI model determines the weather context to be that storms are rapidly developing, the context AI model can determine relatively high data collection rates for the sensors that monitor the weather conditions. Such high data collection rates may be beneficial for ensuring accuracy of predictions made by the primary AI model. If, however, the context AI model determines the weather context to be calm and clear, the context AI model can determine relatively lower data collection rates for sensors that monitor the weather conditions, without adversely affecting the predictions made by the primary AI model. Similarly, if the context AI model determines that traffic is light and flowing smoothly, the context AI model can determine relatively low data collection rates for the sensors that monitor flow of traffic. If, however, the context AI model determines that traffic is heavy and/or not flowing smoothly, the context AI model can determine relatively high data collection rates for the sensors that monitor flow of traffic. As contexts and/or predicted contexts change, the context AI model can dynamically change the sensor data collection rates, in real time, to ensure adequate amount of sensor data is collected for the existing and/or predicted conditions, without collecting an over-abundance of data.

Since the amount of sensor data communicated to the primary AI data is selectively controlled based on the contexts of the conditions, as well as predicted conditions, the primary AI model will process less data. This improves performance of the data processing system(s) by improving efficiency of execution of the primary AI model and reducing use of valuable computing resources used to execute the primary AI model. These improvements can more than offset the use of computing resources used to execute the context AI model. In this regard, the context AI model can generate its predictions using a very small amount of data in comparison to the amount of data consumed by the primary AI model.

Several definitions that apply throughout this document now will be presented.

As defined herein, the term "artificial intelligence model," also referred to herein as "AI model," means a functional data structure including computer-based algorithms enabling computer understanding, using machine learning, deep learning or artificial neural networks, to replicate cognitive decision processes.

As defined herein, the term "artificial intelligence prediction," also referred to herein as "AI prediction," means data output by an artificial intelligence model predicting a future a context and/or contextual information, the prediction made using machine learning, deep learning or artificial neural networks.

As defined herein, the term "Internet of Things device," also referred to herein as "IoT device," means a device, including at least one processor (e.g., a hardware controller) and at least one sensor, that is communicatively linked to at least one data processing system via one or more networks, such as the Internet, and that autonomously communicates sensor data to the at least one data processing system. IoT devices typically do not include an input/output interfaces for directly connecting to mice and keyboards.

As defined herein, the term "digital twin" means a virtual representation of a system that spans the system's lifecycle, is updated from real-time data, and uses simulation, machine learning and reasoning to help decision-making.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a hardware based controller.

As defined herein, the term "server" means a data processing system configured to share services with one or more other data processing systems.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2:
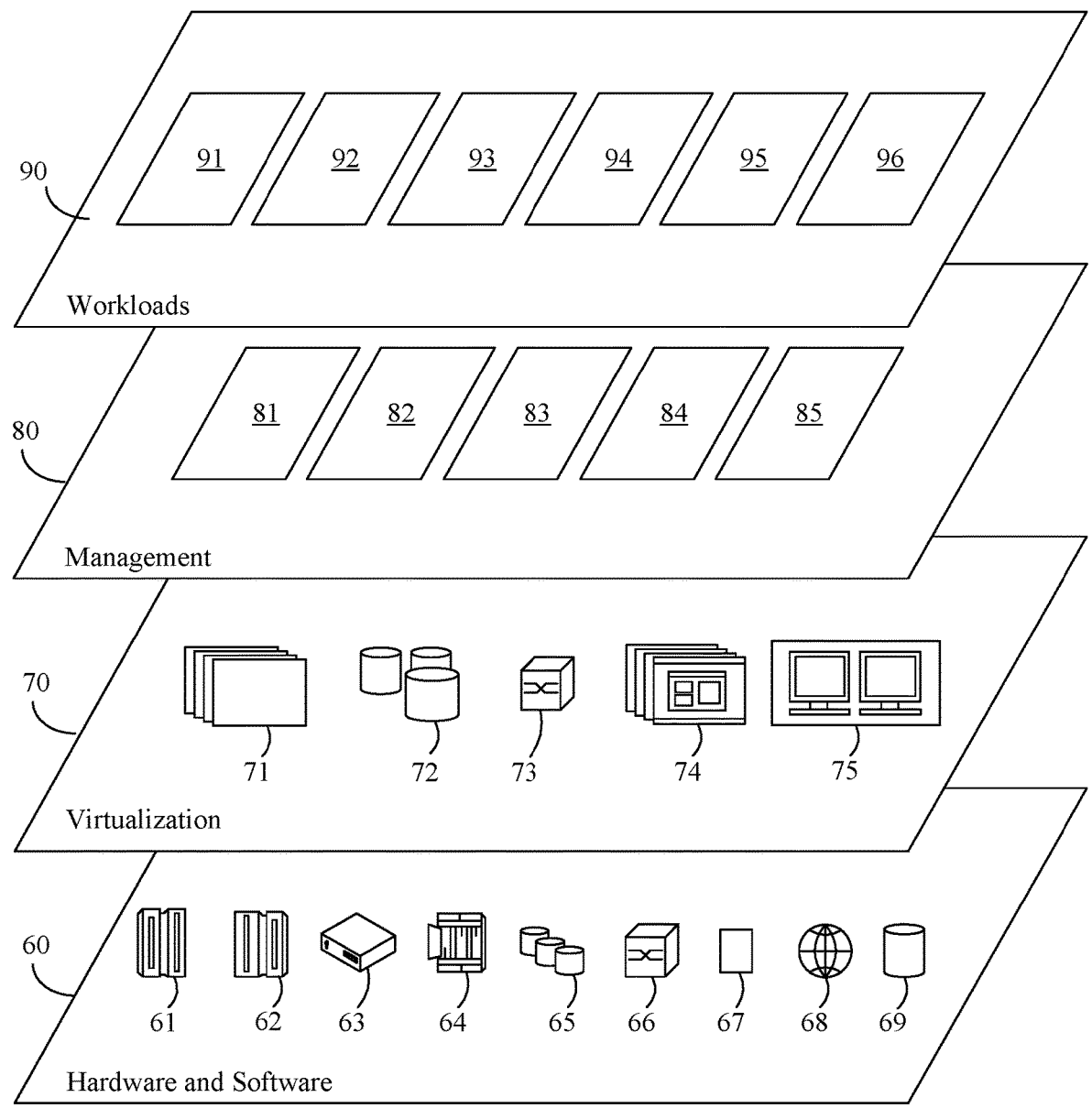
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; networks and networking components 66; and Internet of Things (IoT) devices 67. In some embodiments, software components include network application server software 68 and database software 69.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In an example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: software development and lifecycle management 91; transaction processing 92; data analytics processing 93; weather prediction 94; mapping and navigation 95; and artificial intelligence 96.

Figure 3:
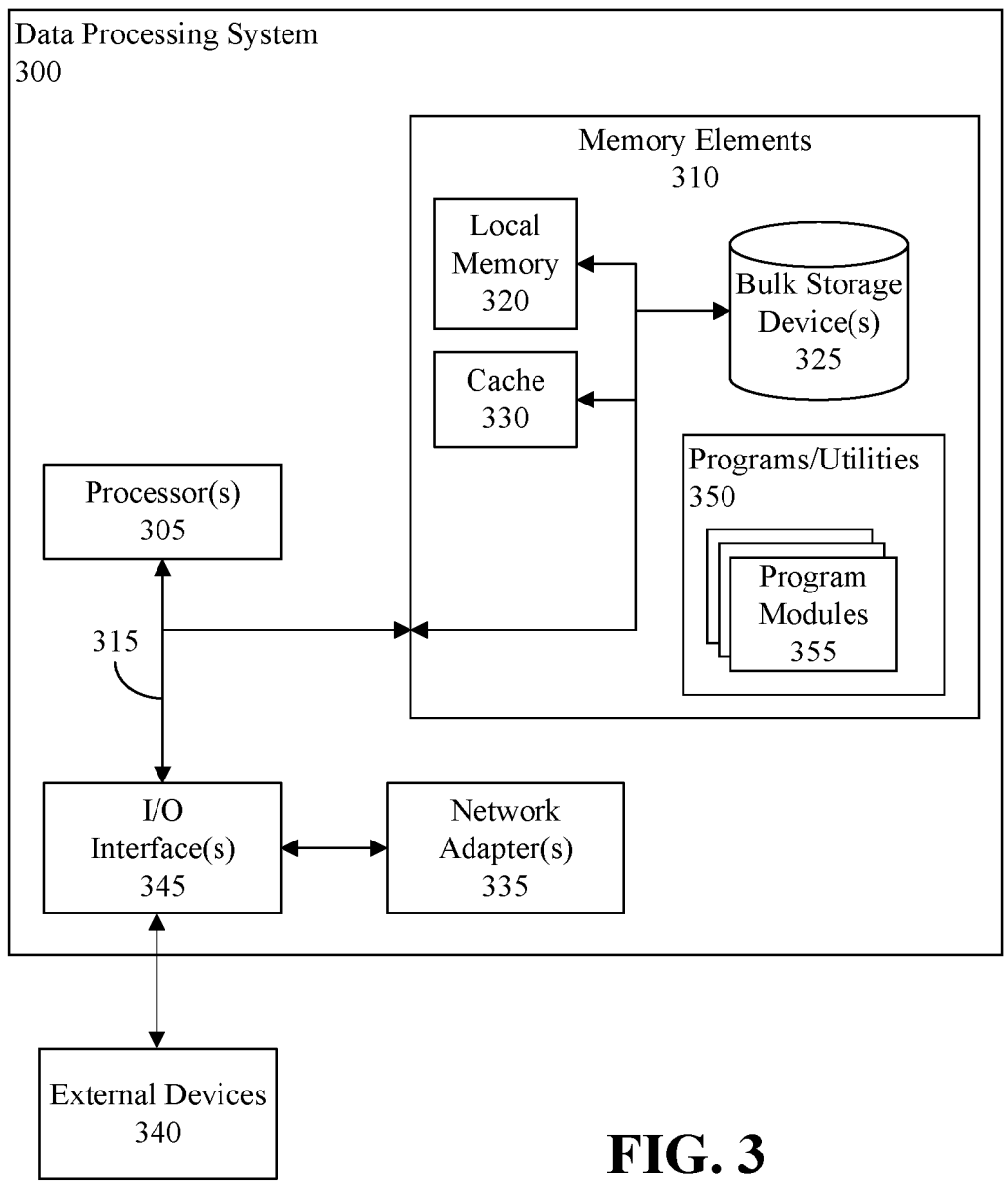
FIG. 3 is a block diagram illustrating example architecture for a data processing system.

FIG. 3 is a block diagram illustrating example architecture for a data processing system 300, which can be implemented as a node of the cloud computing environment 50 (FIG. 1), for example at the hardware and software layer 60 (FIG. 2). The data processing system 300 can include at least one processor 305 (e.g., a central processing unit) coupled to memory elements 310 through a system bus 315 or other suitable circuitry. As such, the data processing system 300 can store program code within the memory elements 310. The processor 305 can execute the program code accessed from the memory elements 310 via the system bus 315. It should be appreciated that the data processing system 300 can be implemented in the form of any system including a processor and memory that is capable of performing the functions and/or operations described within this specification. For example, the data processing system 300 can be implemented as a server, a plurality of communicatively linked servers, a workstation, a desktop computer, a mobile computer, a tablet computer, a laptop computer, a netbook computer, a smart phone, a personal digital assistant, a set-top box, a network appliance, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 300 also can include one or more cache memories 330 that provide temporary storage of at least some program code in order to reduce the number of times program code must be retrieved from the local memory 320 and/or bulk storage device 325 during execution.

Input/output (I/O) devices such as one or more network adapters 335 and various external devices 340 (e.g., a display, a touch screen, a pointing device, a keyboard, etc.) can be coupled to the data processing system 300. The I/O devices can be coupled to the data processing system 300 either directly or through intervening I/O interfaces 342. The network adapters 335 can enable the data processing system 300 to become coupled to other systems, computer systems, remote printers, and/or remote storage devices through intervening private or public networks. Modems, cable modems, transceivers, and Ethernet cards are examples of different types of network adapters 335 that can be used with the data processing system 300.

As pictured in FIG. 3, the memory elements 310 can store programs/utilities 350, including one or more program modules 355, configured to perform processes described herein. For example, programs/utilities 350 can include AI models (430, 435 of FIG. 4) and at least one sensor controller (440 of FIG. 4), which are discussed herein. Being implemented in the form of executable program code, the programs/utilities 350 can be executed by the data processing system 300 (e.g., by the processor 305) and, as such, can be considered part of the data processing system 300. Moreover, the programs/utilities 350 are functional data structures that impart functionality when employed as part of the data processing system 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Date generated by the programs/utilities 350 can be output to, and stored within, the memory elements 310. As used herein, "outputting" and/or "output" can mean storing in the memory elements 310, for example, writing to a file stored in the memory elements 310, writing to a display or other peripheral output device, sending or transmitting to another system, exporting, or similar operations.

Figure 4:
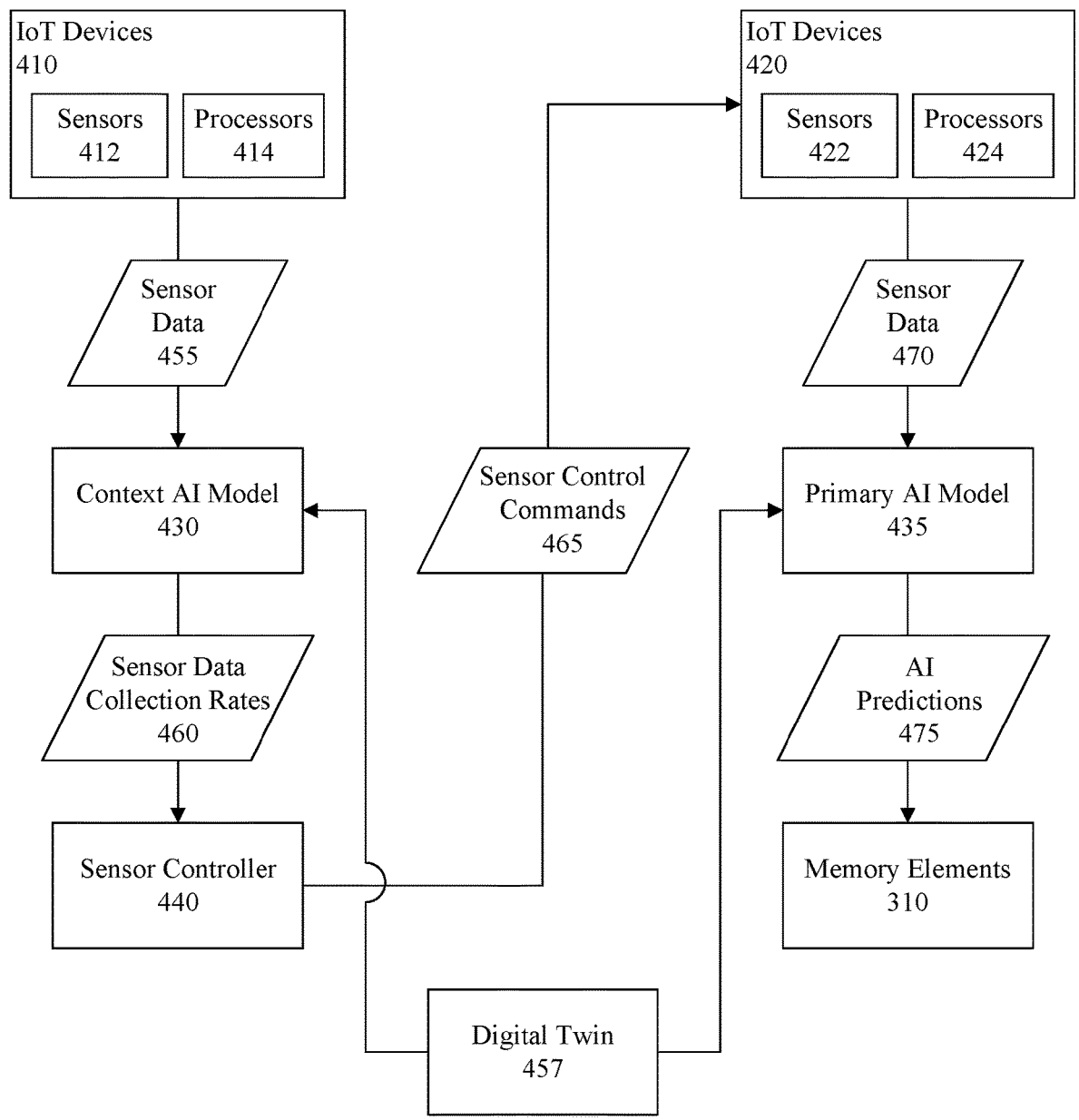
FIG. 4 is a flowchart illustrating an example of a method of selectively controlling a quantity of sensor data communicated to an AI model.

FIG. 4 is a block diagram illustrating an example of an AI modelling system 400 according to an embodiment of the present invention.

The AI modelling system 400 can include a plurality of IoT devices 410 and a plurality of IoT devices 420. The IoT devices 410, 420 can be implemented, for example, as IoT devices 67 of the hardware and software 60 layer (FIG. 2). Each of the IoT devices 410 can include at least one sensor 412 and at least one processor 414 (e.g., a hardware controller). Similarly, each of the IoT devices 420 can include at least one sensor 422 and at least one processor 424 (e.g., a hardware controller). The processors 414, 424 can be configured to control sensors 412, 422 of their respective IoT devices 410, 420. For example, the processors 414, 424 can control rates at which sensors 412, 422 perform sensor measurements, control rates at which sensors 412, 422 generate sensor data, etc. The processors 414, 424 also can control rates at which sensor data is communicated to other components of the AI modelling system 400, for example via network adapters, I/O interfaces, etc. Further, the processors 414, 424 can connect the IoT devices 410, 420 to one or more networks, or the IoT devices 410, 420 can include dedicated network adapters (not shown). The IoT devices 410 can be, for example, infrastructure components of, or near, roadways, components of vehicles configured to travel on roadways, etc. In illustration, automobiles can include IoT devices 410, 420 configured to communicate sensor data to the data processing system 300 (FIG. 3), and the data processing system 300 can be configured to communicate that sensor data to the context AI model 430 and/or the primary AI model 435.

The AI modelling system 400 also can include a context AI model 430, a primary AI model 435 and a sensor controller 440. The AI models 430, 435 can be implemented with artificial intelligence 96 of the workloads layer 90. The sensor controller 440 can be implemented at the management layer 80, for example as part of resource provisioning 81 for the weather prediction 94, mapping and navigation 95, and/or one or more other workloads for which sensor data generated by the sensors 412, 422 is used.

The context AI model 430 can be a real-time counterpart of the primary AI model 435. In this regard, the context AI model 430 can perform the same types of context predictions as the primary AI model 435 based on analyzing the same types of sensor data analyzed by the primary AI model 435, but the amount of sensor data received and processed by the context AI model 430 can be significantly less that the amount of sensor data received and processed by the primary AI model 435. For example, the number of IoT devices 410 from which the context AI model 430 receives sensor data can be less than a threshold percentage of the number of IoT devices 420. The threshold percentage can be, for instance, 0.01%, 0.05%, 0.1%, 0.2%, 0.5%, 1%, or any other desired percentage value. In another example, the number of IoT devices 410 from which the context AI model 430 receives sensor data can be less than a threshold value, which may be determined by the number of IoT devices 410 configured to communicate sensor data 455 to the context AI model 430. In one or more non-limiting arrangements, the IoT devices 410 can be a subset of the IoT devices 420, but this need not be the case. For example, the IoT devices 410 can be dedicated to the context AI model 430. As noted, in the case of IoT devices 410, 420 that are vehicle components, the data processing system 300 can select which of those IoT devices are to be used as IoT devices 410 generating sensor data 455 and which of those IoT devices are to be used as IoT devices 420 generating sensor data 470. The data processing system 300 can be configured choose from the vehicle IoT devices which IoT devices are to be used as IoT devices 410 using a suitable algorithm, for example using random selection, selecting every $n^{th}$ IoT device, etc.

Further, in addition to performing the same types of predictions as the primary AI model 435, the context AI model 430 can determine sensor data collection rates 460 to be used by IoT devices 420 generating sensor data 470 for the primary AI model 435, as will be described.

FIG. 5 is a flowchart illustrating an example of a method 500 of selectively controlling a quantity of sensor data communicated to an AI model. The method 500 can be implemented, for example, by the data processing system 300 of FIG. 3. For ease of understanding, in the following description of the method 500 reference will be made both to FIGS. 4 and 5.

At step 505 the data processing system 300 can receive first sensor data from a first set of IoT devices. For example, the data processing system 300 can receive, from the IoT devices 410, sensor data 455 generated by the sensors 412.

At step 510 the data processing system 300 can determine sensor data collection rates for a first AI model by analyzing the first sensor data using a second AI model. For example, the data processing system 300 can provide the sensor data 455 as input data to the context AI model 430. The context AI model 430 can perform digital twin simulations of the system for which the sensor data 455, 470 is captured. In this regard, the context AI model 430 can access, for example from the memory elements 310, a digital twin 457 of the system. During the digital twin simulations, the context AI model 430 can analyze the sensor data 455 with respect to the digital twin 457 of the system and, based on such analyses, determine contextual information pertaining to parameters contained in the sensor data 455.

In illustration, if a portion of the sensor data 455 contains parameters generated from weather measurements, the context AI model 430 can determine contextual information for the weather using digital twin simulations of future scenarios that may, or are anticipated, to occur. Examples of weather-related contextual information include, but are not limited to, contextual information indicating the following: precipitation rates at various geographic locations; whether it is cloudy at various geographic locations; fog/smoke density at various geographic locations; whether it is sunny at various geographic locations; temperatures at various geographic locations; wind velocities at various geographic locations; changes in weather at various geographic locations; and so on. The contextual information pertaining to determined changes in weather can include, for example, contextual information indicating the following: rates of change in temperatures; rates of change in precipitation rates; rates of change in cloud cover; rates of change of fog/smoke density; rates of change in wind velocities; and so on. In this regard, various ones of the IoT devices 410 can include sensors 412 configured to measure weather-related parameters and can be positioned at different geographic locations.

The context AI model 430 can represent each weather-related contextual information using one or more characters and/or symbols. For example, the AI model 430 can assign a type (e.g., one or more alphanumeric characters) to each type of weather-related contextual information and a value (e.g., a number from 0 to 100) indicating a severity or score determined for that weather-related contextual information.

Further, if another portion of the sensor data 455 contains parameters generated from vehicle traffic measurements on roadways, the context AI model 430 can determine contextual information for the traffic conditions on the various roadways. Examples of vehicle traffic-related contextual information include, but are not limited to, contextual information indicating the following: traffic volume; traffic congestion; traffic speed (e.g., average traffic speed of vehicles); traffic lane closures; traffic acceleration rates (e.g., average acceleration rates of vehicles); traffic deceleration rates (e.g., average deceleration rates of vehicles); changes in traffic conditions; one or more accidents detected; emergency response vehicles traveling to or at geographic locations; emergency response vehicles predicted to be traveling to geographic locations; and so on. The contextual information pertaining to determined changes in traffic conditions can include, for example, contextual information indicating the following: rates of change in traffic volume; rates of change in traffic congestion; rates of change in traffic speed; rates of change in traffic lane closures; rates of change in traffic acceleration rates; rates of change in traffic deceleration rates; and so on. In this regard, various ones of the IoT devices 410 can include sensors 412 configured to measure vehicle traffic-related parameters and can be positioned at different geographic locations along various roadways.

The context AI model 430 can represent each traffic-related contextual information using one or more characters and/or symbols. For example, the AI model 430 can assign a type (e.g., one or more alphanumeric characters) to each type of traffic-related contextual information and a value (e.g., a number from 0 to 100) indicating a severity or score of that traffic-related contextual information.

The context AI model 430, based on other determined contextual information, determine overall contexts represented by the contextual information. For example, continuing with the previous example, the AI model 430 can determine an overall context based on the weather-related contextual information and the vehicle traffic-related contextual information. In a simple example useful for understanding the present arrangements, the AI model 430 can determine the following overall contexts: Context A if traffic is heavy or is predicted to be heaving within a threshold period of time (e.g., fifteen minutes, thirty minutes, one hour, etc.) and adverse weather conditions exist or are predicted to occur within the threshold period of time at geographic region A; Context B if traffic is moderate or is predicted to be moderate within the threshold period of time and adverse weather conditions exist or are predicted to occur within the threshold period of time at geographic region B; Context C if traffic light or is predicted to be light within the threshold period of time and adverse weather conditions exist or are predicted to occur within the threshold period of time at geographic region C; and Context D if traffic if traffic light or is predicted to be light within the threshold period of time and clear weather conditions exist or are predicted to occur within the threshold period of time at geographic region D. Each geographic region A-D can be predetermined. For example, a geographic region can cover a particular one hundred meter segment of a particular roadway, a particular five hundred meter segment of a particular roadway, a particular one kilometer segment of a particular roadway, a particular five kilometer segment of a particular roadway, a particular ten kilometer segment of a particular roadway, etc.

The context AI model 430 can represent each overall context using one or more characters and/or symbols. For example, the AI model 430 can assign one or more indicators (e.g., one or more alphanumeric characters) to each overall context. The indicators can indicate a threshold number of weather-related contextual information and/or traffic-related contextual information having highest contributions in determining the overall context, and for each indicator a indicating the level of contribution by the weather-related contextual information and/or traffic-related contextual information to the overall context.

Based on the determined overall contexts, the context AI model 430 can determine the sensor data collection rates 460 to be implemented by the IoT devices 420 generating sensor data for the various geographic regions. For example, the context AI model 430 can determine sensor data collection rates 460 for various types of sensors that generate sensor data consumed by the primary AI model 435. Further, for each overall context, a set of respective sensor data collection rates can be determined. Table 1 depicts examples of sensor data collection rates 460 that may be determined by the context AI model 430:

TABLE 1

| Sensor Types | Context A | Context B | Context C | Context D |
| --- | --- | --- | --- | --- |
| Type 1 | 78% | 62% | 41% | 28% |
| Type 2 | 82% | 33% | 1% | 31% |
| Type 3 | 0% | 45% | 19% | 24% |
| Type 4 | 13% | 97% | 95% | 44% |
| Type 5 | 13% | 87% | 74% | 49% |
| Type 6 | 92% | 94% | 7% | 18% |
| Type 7 | 8% | 13% | 81% | 4% |
| Type 8 | 71% | 34% | 30% | 1% |

In the above examples, the sensor data collection rates 460 can be specified as percentage values. Each percentage value can indicate a data generation rate for a particular type of sensor 422 for a determined overall context. The percentage values can be from 0% to 100%, where 0% indicates no sensor data is to be measured by the sensors 422 and/or communicated to the primary AI model 435 and 100% indicates that sensor data is to be measured by the sensors 422 and communicated to the primary AI model 435 at the maximum data collection/communication rate specified for the particular type of sensor 422. Percentage values between from 0% and 100% can be percentage portions of the maximum data collection/communication rates for the particular sensors 422. Nonetheless, the data collection rates can be specified, for example, as numbers of measurements per second, numbers of measurements per minute, numbers of measurements per hour, or specified in any other suitable manner.

A set of sensor data collection rates 460 can be determined for each overall context. In illustration, the set of sensor data collection rates in the column having the heading "Context A" can be the set of sensor data collection rates for the overall context "Context A." Similarly, the set of sensor data collection rates 460 in the column having the heading "Context B" can be the set of sensor data collection rates for the overall context "Context B," and so on. Each sensor data collection rate 460 in a set can be determined for a particular type of sensor 422. For instance, if there are eight different types of sensors deployed along a roadway segment to which the overall context "Context A" is assigned, the set of sensor data collection rates 460 for that roadway segment can include eight sensor data collection rates. One or more same types of sensors 422 may be deployed along different roadway segments. For a particular type of sensor 422, different sensor data collection rates 460 can be specified for the different roadway segments.

The context AI model 430 also can determine overall contexts much more granularly, taking into consideration various types of traffic conditions that may occur and various types of weather conditions that may occur. In this regard, over time the context AI model 430 can determine tens, hundreds, and even thousands of different overall contexts for different weather-related contextual information and vehicle traffic-related contextual information, which the context AI model 430 may determine to exist and/or predict to occur at various geographic regions.

The context AI model 430 can change the determined sensor data collection rates 460 as the overall context changes. For example, responsive to the AI model 430 determining one or more overall contexts changing by at least a threshold value, the context AI model 430 can change the data collection rates for the overall context(s) that has/have changed. The threshold value can be pre-defined, for example by a user. In illustration, the AI model 430 can continually monitor analyze the sensor data 455 as the sensor data 455 is received to determine the weather-related contextual information and/or one or more vehicle traffic-related contextual information in real time, and determine the overall contexts, in real time, based on the newly received sensor data 455. Further, for each roadway segment, the context AI model 430 can compare the current overall context to the previous overall content for that roadway segment, and determine whether the overall context has changed by at least the threshold value. If so, the context AI model 430 can determine new sensor data collection rates 460 for various types of sensors monitoring data for that roadway segment that generate sensor data consumed by the primary AI model 435.

The context AI model 430 can train itself over time, using artificial intelligence, to improve the contextual information predictions and the overall context predictions made by the context AI model 430. For example, the context AI model 430 can monitor actual weather-related contextual information, actual vehicle traffic-related contextual information and actual overall contexts. The context AI model 130 can compare that actual data to weather-related contextual information, vehicle traffic-related contextual information and overall contexts predicted by the context AI model 430. The context AI model 430 can be configured to, based on the comparisons, update parameters used for predicting the weather-related contextual information, vehicle traffic-related contextual information and overall contexts in order to improve the predictions. Such training can use AI model training algorithms. Further, in one or more arrangements, one or more knowledge corpora comprising sensor data for overall contexts can be used to train the context AI model 430. For instance, the knowledge corpora can include previously generated sensor data for previously determined overall contexts. By way of example, the context AI model 430 can use AI model training algorithms with knowledge corpora as inputs to perform an initial training of the context AI model 130. The context AI model 430 can supplement the initial AI training using the actual vehicle traffic-related contextual information and actual overall contexts to perform additional AI training.

As an example, a vehicle may be generating sensor values for one contextual situation that are be different than sensor values generated for another contextual situation. A contextual situation, may, for example, depend on a condition of the vehicle. For example, a vehicle with new tires can quickly stop, but as the tires wear the amount of grip can decline, and this it will take a greater amount of time and distance to stop. So, for same weather contextual situation, a vehicle with older tires needs may need to start breaking before the same type of vehicle with new tires. The context AI model 430 can perform digital twin simulations that consider tread wear on various vehicles, among a myriad of other parameters and contextual scenarios.

The context AI model 430 can communicate, to the sensor controller 440, the sensor data collection rates 460 determined by the context AI model 430. The context AI model 430 can indicate to the sensor controller 440 to which roadway segments the sensor data collection rates 460 apply. In one or more arrangements, the context AI model 430 can communicate to the sensor controller 440 the sensor data collection rates 460 in real time as the context AI model 430 determines the sensor data collection rates 460. For example, each time the context AI model 430 changes the sensor data collection rates 460 for a particular roadway segment, the AI model 430 can communicate to the sensor controller 440 the new sensor data collection rates 460 for that roadway segment.

In one or more other arrangements, the context AI model 430 can communicate to the sensor controller 440 the sensor data collection rates 460 at periodic time intervals, for example at predefined intervals. The predefined intervals may be specified by a user. For example, at predefined time intervals the context AI model 430 can communicate to the sensor controller 440 sensor data collection rates 460 that have been updated based on changes in overall contexts. In another example, the context AI model 430 can communicate to the sensor controller 440 sensor all current sensor data collection rates 460.

At step 515, based on the sensor data collection rates the data processing system 300 can communicate sensor control commands to a second set of Internet of Things devices. The sensor control commands can specify, to the second set of IoT devices, sensor data communication rates that respective ones of the second set of IoT devices are to implement for communicating, to the first AI model, second sensor data generated by sensors of the respective ones of the second set of IoT devices.

For example, the sensor controller 440 can communicate, to the IoT devices 420, the sensor control commands 465. The sensor control commands 465 can specify to the respective processors 424 the sensor data communication rates the respective IoT devices 420 are to implement for communicating, to the primary AI model 435, sensor data generated by their respective sensors 422. The processors 424 can control the sensors 422 to generate sensor data at the specified sensor data collection rates 460 and/or control communication of the sensor data at the specified sensor data collection rates 460.

As noted, the context AI model 430 can indicate to the sensor controller 440 to which roadway segments the sensor data collection rates 460 apply. Continuing with the example presented for table 1, Context A can apply to a first roadway segment, Context B can apply to a second roadway segment, Context C can apply to a third roadway segment, Context D can apply to a fourth roadway, and so on. The context AI model 430 can indicate which roadway segments the data collection rates in the respective columns apply.

For each roadway segment, the sensor controller 440 can determine which IoT devices 420 are assigned to the various roadway segments. For example, the sensor controller 440 can access from a first data table data indicating geographic coordinates for each roadway segment, and access from a second data table data indicating geographic coordinates for each of the IoT devices 420. Further, the sensor controller 440 can access from a third data table data indicating the types of sensor data generated by each of the IoT devices 420. The data tables can be accessed from the memory elements 310 (FIG. 3), for example from the bulk storage device(s) 325. In one or more other arrangements, the sensor controller 440 can access the data tables from one or more other systems (e.g., data processing systems or data storage systems) to which the data processing system 300 is communicatively linked.

Based on the data accessed from the data tables, the sensor controller 440 can determine which IoT devices 420 are assigned to the which roadway segments and determine the type of data generated by each IoT device 420. Based on those determinations, in conjunction with the sensor data collection rates 460 received by the sensor controller 440, the sensor controller 440 can determine, for each IoT device 420, the rate at which the IoT device 420 is to communicate sensor data to the primary AI model 435. For example, for IoT devices 420 for a roadway segment assigned "Context A" having sensors 422 that are "Type 1," the sensor controller 440 can communicate to those IoT devices 420 sensor control commands 465 specifying a sensor data collection rate of 78%. For IoT devices 420 for the roadway segment assigned "Context A" having sensors 422 that are "Type 2," the sensor controller 440 can communicate to those IoT devices 420 sensor control commands 465 specifying a sensor data collection rate of 82%, and so on. If one or more IoT devices 420 include multiple types of sensors, the sensor controller 440 can communicate to those IoT device 420 sensor control commands 465 specifying the sensor data collection rate to be used for each of the different types of the sensors 422.

At step 520 the data processing system 300 can receive sensor data from the second set of IoT devices. For example, the primary AI model 435 can receive from the IoT devices 420 sensor data generated by their respective sensors 422 at the specified sensor data collection rates 460. If certain types of sensors 422 are deactivated (e.g., having a specified data collection rate of 0%), the primary AI model 435 need not receive sensor data 470 from their respective IoT devices 420.

In one or more arrangements, the specified sensor data collection rates 460 can be threshold values. The processors 424 of the IoT devices 420 can be configured to control the sensors 422 to make sensor measurements and generate sensor data 470 at the threshold value, or within a specified tolerance of the threshold value, for example at a rate within 1%, 2%, 3%, 4%, 5%, etc. of the threshold value. Further, the threshold value can a maximum sensor data collection rate 460 or a minimum data collection rate 460 to be observed by the processors 424/sensors 422. In arrangements in which sensors 422 are configured to continually generate sensor data, the processors 424 can be configured to limit communication of the sensor data 470 to the primary AI model 435 to the sensor data collection rates 460 specified by the sensor control commands 465.

During the digital twin simulations, the context AI model 430 can analyze the sensor data 455 with respect to the digital twin of the system and, based on such analyses, determine contextual information pertaining to parameters contained in the sensor data 455.

At step 525 the data processing system 300 can determine, by the first AI model, AI predictions by processing the second sensor data. For example, the primary AI model 435 can perform digital twin simulations of the system for which the sensor data 470 is captured. In this regard, the context AI model 430 can access, for example from the memory elements 310, the digital twin 457 of the system. During the digital twin simulations, the primary AI model 435 can analyze the sensor data 470 received from the IoT devices 420 with respect to the digital twin 457 of the system and, based on such analyses, determine weather-related contextual information, traffic-related contextual information and overall contexts for roadway segments assigned to the primary AI model 435, for example as previously described with regard to the context AI model 430 determining the weather-related contextual information, traffic-related contextual information and overall contexts. Based on the overall contexts, the primary AI model 435 can generate AI predictions 475 that predict impact of the weather-related contextual information, traffic-related contextual information, and overall contexts on vehicle traffic patterns.

At step 530 the data processing system 300 can output the AI predictions. For example, the primary AI model 435 can output the AI predictions 475 to the memory elements 310. Further, the primary AI model 435 can output the AI predictions 475 to one or more displays, to one or more other data processing systems, and so on.

The primary AI model 435 can train itself over time to improve the AI predictions made by the primary AI model 435. For example, the primary AI model 435 can monitor actual weather-related contextual information, actual vehicle traffic-related contextual information, actual overall contexts, and actual traffic impact predictions. The AI model 435 can compare that actual data to weather-related contextual information, vehicle traffic-related contextual information, overall contexts and traffic impact predicted by the primary AI model 435. The primary AI model 435 can be configured to, based on the comparisons, update parameters used for predicting the weather-related contextual information, vehicle traffic-related contextual information, overall contexts, and traffic impacts in order to improve the predictions. Such training can use AI model training algorithms.

In one or more arrangements, one or more steps 505-535 can be performed by one or more other data processing systems. For example, steps 505-520 can be performed by the data processing system 300 and steps 525-535 can be performed by another data processing system, for example another data processing system at the hardware and software 60 layer (FIG. 2). In this regard, the other data processing system can include the primary AI model 435, in which case the data processing system 300 need not include the primary AI model 435.

The foregoing description is just an example of embodiments of the invention, and variations and substitutions. While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving first sensor data from a first set of Internet of Things devices;
determining sensor data collection rates for a first artificial intelligence model by analyzing the first sensor data using a second artificial intelligence model executed by a processor; and
based on the sensor data collection rates, communicating sensor control commands to a second set of Internet of Things devices, the sensor control commands specifying, to the second set of Internet of Things devices, sensor data communication rates that respective ones of the second set of Internet of Things devices are to implement for communicating, to the first artificial intelligence model, second sensor data generated by sensors of the respective ones of the second set of Internet of Things devices.

2. The method of claim 1, further comprising:
receiving the second sensor data from the second set of Internet of Things devices;
determining, by the first artificial intelligence model, artificial intelligence predictions by analyzing the second sensor data; and
outputting the artificial intelligence predictions.

3. The method of claim 1, wherein the determining the sensor data collection rates for the first artificial intelligence model comprises:
based on the first sensor data, determining a plurality of contextual information;
based on the plurality of contextual information, determining a plurality of overall contexts; and
determining a respective set of the sensor data collection rates for each of the plurality of overall contexts.

4. The method of claim 3, wherein each respective set of the sensor data collection rates specifies a plurality of the sensor data collection rates, each of the plurality of the sensor data collection rates assigned to a respective sensor type.

5. The method of claim 4, wherein a first data collection rate, specified for a particular sensor type, in a first set of the sensor data collection rates differs from a second data collection rate, specified for the particular sensor type, in a second set of the sensor data collection rates.

6. The method of claim 3, wherein at least a portion of the plurality of contextual information is predicted by the second artificial intelligence model.

7. The method of claim 6, further comprising:
the second artificial intelligence model improving contextual information predictions by training itself using artificial intelligence, the training comprising:
monitoring actual contextual information;
comparing the actual contextual information to the contextual information predictions; and
updating parameters used for predicting the contextual information.

8. A system, comprising:
a processor programmed to initiate executable operations comprising:
receiving first sensor data from a first set of Internet of Things devices;
determining sensor data collection rates for a first artificial intelligence model by analyzing the first sensor data using a second artificial intelligence model; and
based on the sensor data collection rates, communicating sensor control commands to a second set of Internet of Things devices, the sensor control commands specifying, to the second set of Internet of Things devices, sensor data communication rates that respective ones of the second set of Internet of Things devices are to implement for communicating, to the first artificial intelligence model, second sensor data generated by sensors of the respective ones of the second set of Internet of Things devices.

9. The system of claim 8, the executable operations further comprising:
receiving the second sensor data from the second set of Internet of Things devices;
determining, by the first artificial intelligence model, artificial intelligence predictions by analyzing the second sensor data; and
outputting the artificial intelligence predictions.

10. The system of claim 8, wherein the determining the sensor data collection rates for the first artificial intelligence model comprises:
based on the first sensor data, determining a plurality of contextual information;
based on the plurality of contextual information, determining a plurality of overall contexts; and
determining a respective set of the sensor data collection rates for each of the plurality of overall contexts.

11. The system of claim 10, wherein each respective set of the sensor data collection rates specifies a plurality of the sensor data collection rates, each of the plurality of the sensor data collection rates assigned to a respective sensor type.

12. The system of claim 11, wherein a first data collection rate, specified for a particular sensor type, in a first set of the sensor data collection rates differs from a second data collection rate, specified for the particular sensor type, in a second set of the sensor data collection rates.

13. The system of claim 10, wherein at least a portion of the plurality of contextual information is predicted by the second artificial intelligence model.

14. The system of claim 8, the executable operations further comprising:
the second artificial intelligence model improving contextual information predictions by training itself using artificial intelligence, the training comprising:
monitoring actual contextual information;
comparing the actual contextual information to the contextual information predictions; and
updating parameters used for predicting the contextual information.

15. A computer program product, comprising:
one or more computer readable storage mediums having program code stored thereon, the program code stored on the one or more computer readable storage mediums collectively executable by a data processing system to initiate operations including:
receiving first sensor data from a first set of Internet of Things devices;
determining sensor data collection rates for a first artificial intelligence model by analyzing the first sensor data using a second artificial intelligence model; and based on the sensor data collection rates, communicating sensor control commands to a second set of Internet of Things devices, the sensor control commands specifying, to the second set of Internet of Things devices, sensor data communication rates that respective ones of the second set of Internet of Things devices are to implement for communicating, to the first artificial intelligence model, second sensor data generated by sensors of the respective ones of the second set of Internet of Things devices.

16. The computer program product of claim 15, wherein the program code is executable by the data processing system to initiate operations further comprising:

receiving the second sensor data from the second set of Internet of Things devices;

determining, by the first artificial intelligence model, artificial intelligence predictions by analyzing the second sensor data; and outputting the artificial intelligence predictions.

17. The computer program product of claim 15, wherein the determining the sensor data collection rates for the first artificial intelligence model comprises:

based on the first sensor data, determining a plurality of contextual information;

based on the plurality of contextual information, determining a plurality of overall contexts; and determining a respective set of the sensor data collection rates for each of the plurality of overall contexts.

18. The computer program product of claim 17, wherein each respective set of the sensor data collection rates specifies a plurality of the sensor data collection rates, each of the plurality of the sensor data collection rates assigned to a respective sensor type.

19. The computer program product of claim 18, wherein a first data collection rate, specified for a particular sensor type, in a first set of the sensor data collection rates differs from a second data collection rate, specified for the particular sensor type, in a second set of the sensor data collection rates.

20. The computer program product of claim 17, wherein at least a portion of the plurality of contextual information is predicted by the second artificial intelligence model.

* * * * *